United States Patent Office 3,819,752
Patented June 25, 1974

3,819,752
O-ACRYLIC ACID ESTER-O-ALKYL-(THIO)-
PHOSPHONIC AMIDES
Ernst Beriger, Neu-Allschwil, Switzerland, assignor to
Ciba-Geigy Corporation, Ardsley, N.Y.
No Drawing. Filed July 7, 1972, Ser. No. 269,904
Claims priority, application Switzerland, July 22, 1971,
10,888/71; May 30, 1972, 7,969/72
Int. Cl. A01n 9/36; C07f 9/24
U.S. Cl. 260—941       3 Claims

ABSTRACT OF THE DISCLOSURE

O-Acrylic acid ester-O-alkyl-(thio)-phosphonic amides of the formula

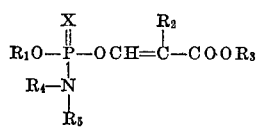

wherein $R_1$ represents $C_1$–$C_4$ alkyl, $R_2$ represents hydrogen or $C_1$–$C_2$ alkyl, $R_3$ represents $C_1$–$C_6$ alkyl, $C_2$–$C_6$ alkenyl, $C_2$–$C_6$ alkinyl, unsubstituted or substituted phenyl or aralkyl, $R_4$ and $R_5$ each represent hydrogen, $C_1$–$C_4$ alkyl, $C_2$–$C_5$ alkenyl or $C_2$–$C_5$ alkinyl and X represents oxygen or sulphur, their manufacture and their use in pest control.

The present invention relates to O-acrylic acid ester-O-alkyl-(thio)-phosphoric amides, their manufacture and their use in pest control.

The phosphoric amides have the formula

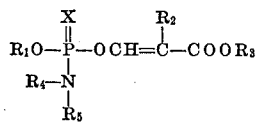

wherein $R_1$ represents $C_1$–$C_4$ alkyl, $R_2$ represents hydrogen or $C_1$–$C_2$ alkyl, $R_3$ represents $C_1$–$C_6$ alkyl, $C_2$–$C_6$ alkenyl, $C_2$–$C_6$ alkinyl, unsubstituted or substituted phenyl or aralkyl, $R_4$ and $R_5$ each represent hydrogen, $C_1$–$C_4$ alkyl, $C_2$–$C_5$ alkenyl or $C_2$–$C_5$ alkinyl and X represents oxygen or sulphur.

The alkyl, alkenyl and alkinyl groups represented by $R_1$, $R_2$, $R_3$, $R_4$ and $R_5$ may be straight-chain or branched and the alkyl group represented by $R_3$ may also be interrupted by one or more oxygen or sulphur atoms or substituted by a cyano group.

Examples of such groups include: methyl, ethyl, propyl, isopropyl, n-i-, sec.-, tert.-butyl, allyl, propargyl, —$C_2H_4OCH_3$, —$C_2H_4SC_2H_5$, —$C_2H_4OC_2H_4OCH_3$,

—$C_2H_4CN$.

One or more fluorine, chlorine, bromine and/or iodine atoms and/or $C_1$–$C_4$ alkyl groups, for example, may be present at the phenyl ring which is possible for $R_3$.

By aralkyl represented by $R_3$ are meant chiefly radicals of the formulae

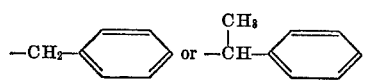

Preferred compounds are those of the formula I, wherein $R_1$ represents methyl or ethyl, $R_2$ represents methyl or ethyl, $R_3$ represents methyl, ethyl, propyl, isopropyl, n-butyl, tert.-butyl, allyl or the groups

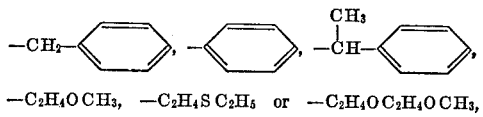

—$C_2H_4OCH_3$, —$C_2H_4SC_2H_5$ or —$C_2H_4OC_2H_4OCH_3$, $R_4$ represents methyl, ethyl, propyl, isopropyl or isobutyl, $R_5$ represents oxygen or sulphur.

The compounds of the formula I are manufactured by methods which are known in the art, by
(a) Reacting a compound of the formula

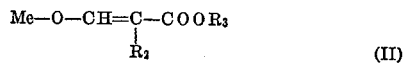

with a compound of the formula

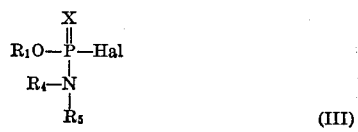

or
(b) Reacting a compound of the formula

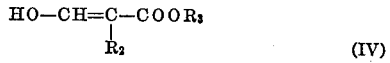

with the compound of the formula III in the presence of an acid binding agent, or
(c) Reacting a compound of the formula

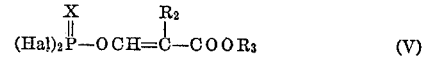

preferably in succession with the compounds $R_1OH$ (VI) and

in the presence of an acid binding agent, or
(d) Reacting a compound of the formula

with a compound of the formula II or IV and with a compound of the formula VII, preferably in succession and optionally in the presence of an acid binding agent, or
(e) Reacting a compound of the formula

preferably in succession with compounds of the formulae VI and II and optionally in the presence of an acid binding agent. In the formulae II to IX, the symbols $R_1$ to $R_5$ and X have the same meanings as given for the formula I. Hal represents halogen, such as fluorine, chlorine, bromine or iodine, but in particular chlorine or bromine, and Me represents an alkali metal, such so sodium or potassium.

The reactions (a) to (e) take place at temperatures between 10° C. and 80° C. The following bases are suitable acid binding agents for the processes (b), (c), (d) and (e): tertiary amines, such as triethylamine, dimethyl aniline, pyridine, pyridine bases; inorganic bases, such as hydroxides and carbonates of alkali and alkaline earth metals, preferably sodium and calcium carbonate, sodium and potassium bicarbonate; alcoholates, such as sodium methylate, tert.butylate and metal hydrides, such as sodium methylate, tert.butylate and metal hydrides, such as sodium hydrides, such as sodium hydride and calcium hydride.

The reactions (a) to (e) are carried out preferably in inert solvents. The following, for example, are suitable for this purpose: aromatic hydrocarbons, such as benzene, toluene, petroleum ethers, chlorobenzene, polychlorobenzenes, bromobenzene, chlorinated alkanes containing from 1 to 3 carbon atoms; et hers, such as dioxan, tetrahydrofuran; esters, such as ethyl acetate; ketones, such as methyl ethyl ketone, diethyl ketone; nitriles, such as acetonitrile; amides, such as dimethyl formamide; dimethyl sulphoxide and tetramethyl sulphone.

Some of the starting materials of the processes (a) to (e) are known or may be manufactured in analogous manner to known processes which are described in the literature. The active substances of the formula I are suitable for combating animal and plant pests of the most diverse kinds. Individual compounds, thus possess, for example, fungicidal, bactericidal, nemaidicidal, growth inhibiting and abscission promoting properties.

In particular the compounds of the formula I possess insecticidal and acaricidal properties and may be used against all development stages such, for example, as eggs, larve, pupae, nymphs and adults of insects and representatives of the order Acarina, e.g. against insects of the families:

| | |
|---|---|
| Teltigonidae | Tenebrionidae |
| Gryllidae | Chrysomelidae |
| Gryllotalpidae | Bruchidae |
| Blattidae | Tineidae |
| Peduviidae | Noctuidae |
| Phyrrhocoriae | Lymatriidae |
| Cimicidae | Pyralidae |
| Delphacidae | Culicidae |
| Aphididae | Tipulidae |
| Diaspididae | Stomoxydae |
| Pseudococcidae | Trypetidae |
| Scarabaeidae | Muscidae |
| Dermestidae | Calliphoridae and |
| Coccinellidae | Pulicidae. |

Acarida of the families:

| | |
|---|---|
| Ixodidae | Tetranychidae and |
| Argasidae | Dermanyssidae. |

The insecticidal and/or acaricidal action can be substantially broadened and adapted to suit the particular circumstances by the addition of other insecticides and/or acaricides.

Suitable additives include, for example, the following active substances:

Bis-O,O-diethylphosphoric acid anhydride (TEPP)
Dimethyl-(2,2,2-trichloro-1-hydroxyethyl)-phosphonate (Trichlorfon)
1,2-dibromo-2,2-dichloroethyldimethylphosphate (Naled)
2,2-dichlorovinyldimethylphosphate (Dichlorvos)
2-methoxycarbamyl-1-methylvinyldimethylphosphate (Mevinphos)
Dimethyl-1-methyl-2-(methylcarbamoyl)-vinylphosphate cis (Monocrotophos)
3-(dimethoxyphosphinyloxy)-N,N-dimethyl-cis-crotonamide (Dicrotophos)
2-chloro-2-diethylcarbamoyl-1-methylvinyldimethylphosphate (Phosphamidon)
O,O-diethyl-O(or S)-2-(ethylthio)-ethylthiophosphate (Demeton)
S-ethylthioethyl-O,O-dimethyl-dithiophosphate (Thiometon)
O,O-diethyl-S-ethylmercaptomethyldithiophosphate (Phorate)
O,O-diethyl-S-2-(ethylthio)ethyldithiophosphate (Disulfoton)
O,O-dimethyl-S-2-(ethylsulphinyl)ethylthiophosphate (Oxydemeton Methyl)
O,O-dimethyl-S-(1,2-dicarbethoxyethyldithiophosphate (Malathion)
O,O,O,O-tetraethyl-S,S'-methylene-bis-dithiophosphate (Ethion)
O-ethyl-S,S-dipropyldithiophosphate
O,O-dimethyl-S-(N-methyl-N-formylcarbamoylmethyl)-dithiophosphate (Formothion)
O,O-dimethyl-S-(N-methylcarbamoylmethyl)dithiophosphate (Dimethoate)
O,O-dimethyl-O-p-nitrophenylthiophosphate (Parathion-Methyl)
O,O-diethyl-O-p-nitrophenylthiophosphate (Parathion)
O-ethyl-O-p-nitrophenylphenylthiophosphate (EPN)
O,O-dimethyl-O-(4-nitro-m-tolyl)thiophosphate (Fenitrothion)
O,O-dimethyl-O-2,4,5-trichlorophenylthiophosphate (Ronnel)
O-ethyl-O,2,4,5-trichlorophenylethylthiophosphate (Trichloronate)
O,O-dimethyl-O-2,5-dichloro-4-bromophenylthiophosphate (Bromophos)
O,O-dimethyl-O-(2,5-dichloro-4-jodphenyl)-thiophosphate (Jodofenphos)
4-tert. butyl-2-chlorophenyl-N-methyl-O-methyl-amidophosphate (Crufomate)
O,O-dimethyl-O-(3-methyl-4-methylmercaptophenyl)-thiophosphate (Fenthion)
Isopropylamino-O-ethyl-O-(4-methylmercapto-3-methylphenyl)phosphate
O,O-diethyl-O-p-(methylsulphinyl)phenyl-thiophosphate (Fensulfothion)
O-p-(dimethylsulphamido)phenyl-O,O-dimethylthiophosphate (Famphur)
O,O,O',O'-tetramethyl-O,O'-thiodi-p-phenylenethiophosphate
O-ethyl-S-phenyl-ethyldithiophosphate
O,O-dimethyl-O-(α-methylbenzyl-3-hydroxycrotonyl)phosphate
2-chloro-1-(2,4-dichlorophenyl)vinyl-diethylphosphate (Chlorfenvinphos)
1-chloro-1-(2,4,5-trichlorophenyl)vinyl-dimethylphosphate
O-[2-chloro-1-(2,5-dichlorophenyl)]vinyl-O,O-diethylthiophosphate
Phenylglyoxylonitriloxim-O,O-diethylthiophosphate (Phoxim)
O,O-diethyl-O-(3-chloro-4-methyl-2-oxo-2-H-1-benzopyran-7-yl)thiophosphate (Coumaphos)
2,3-p-dioxandithiol-S,S-bis(O,O-diethyldithiophosphate) (Dioxathion)
5-[(6-chloro-2-oxo-3-benzoxazolinyl)methyl]-O,O-diethyldithiophosphate (Phosalone)
2-(diethoxyphosphinylimino)-1,3-dithiolane
O,O-dimethyl-S-[2-methoxy-1,3,4-thiadiazol-5-(4H)-onyl-(4)-methyl]dithiophosphate
O,O-dimethyl-S-phthalimidomethyl-dithiophosphate (Imidan)
O,O-diethyl-O-(3,5,6-trichloro-2-pyridyl)thiophosphate
O,O-diethyl-O-2-pyrazinylthiophosphate (Thionazin)
O,O-diethyl-O-(2-isopropyl-4-methyl-6-pyrimidyl)thiophosphate (Diazinon)
O,O-diethyl-O-(2-chinoxalyl)thiophosphate
O,O-dimethyl-S-(4-oxo-1,2,3-benzotriazin-3(4H)-yl-methyl)-dithiophosphate (Azinphosmethyl)
O,O-diethyl-S-(4-oxo-1,2,3-benzotriazin-3(4H)-yl-methyl)dithiophosphate (Azinphosethyl)
S-[(4,6-diamino-s-triazin-2-yl)methyl]-O,O-dimethyl-dithiophosphate (Menazon)
O,O-dimethyl-O-(3-chloro-4-nitrophenyl)thiophosphate (Chlorthion)
O,O-dimethyl-O(or S)-2-ethylthioethyl)thiophosphate (Demeton-S-Methyl)
2-(O,O-dimethyl-phosphoryl-thiomethyl)-5-methoxypyron-4-3,4-dichlorobenzyl-triphenylphosphonium-
  chloride
O,O-diethyl-S-(2,5-dichlorophenylthiomethyl)
  dithiophosphate (Phenkapton)
O,O-diethyl-O-(4-methyl-cumarinyl-7-)-thiophos-
  phate (Potasan)
5-amino-bis(dimethylamido)phosphinyl-3-phenyl-1,2,4-
  triazole (Triamiphos)
N-methyl-5-(O,O-dimethylthiophosphoryl)-3-thiavaler-
  amide (Vamidothion)
O,O-diethyl-O-[2-diemthylamino-4-methylpyrimidyl-
  (6)]-thiophosphate (Diocthyl)
O,O-dimethyl-S-(methylcarbamoylmethyl)-thiophos-
  phate (Omethoate)
O-ethyl-O-(8-quinolinyl)-phenylthiophosphonate
  (Oxinothiophos)
O-methyl-S-methyl-amidothiophosphate (Monitor)
O-methyl-O-(2,5-dichloro-4-bromophenyl)-benzothio-
  phosphate (Phosvel)
O,O,O,O-tetrapropyldithiophosphate
3-(dimethoxyphosphinyloxy)-N-methyl-N-methoxy-cis-
  crotonamide
O,O-dimethyl-S-(N-ethylcarbamoylmethyl)dithio-
  phosphate (Ethoate-Methyl)
O,O-diethyl-S-(N-isopropylcarbamoylmethyl)-dithio-
  phosphate (Prothoate)
S-N-(1-cyano-1-methylethyl)carbamoylmethyldiethyl-
  thiolphosphate (Cyanthoate)
S-(2-acetamidoethyl)-O,O-dimethyldithiophosphate
Hexamethylphosphoric acid triamide (HEMPA)
O,O-dimethyl-O-(2-chloro-4-nitrophenyl)thiophos-
  phate (Dicapthon)
O,O-dimethyl-O-p-cyanophenyl thiophosphate (Cyanox)
O-ethyl-O-p-cyanophenylthiophosphonate
O,O-diethyl-O-2,4-dichlorophenylthiophosphate
  (Dichlorfenthion)
O,2,4-dichlorophenyl-O-methylisopropylamidothio-
  phosphate
O,O-diethyl-O-2,5-dichloro-4-bromophenylthiophos-
  phate (Bromophos-Ethyl)
Dimethyl-p-(methylthio)phenylphosphate
O,O-dimethyl-O-p-sulfamidophenylthiophosphate
O-[p-(p-chlorophenyl)azophenyl]O,O-dimethylthio-
  phosphate (Azothoate)
O-ethyl-S-4-chlorophenyl-ethyldithiophosphate
O-isobutyl-S-p-chlorophenyl-ethyldithiophosphate
O,O-dimethyl-S-p-chlorophenylthiophosphate
O,O-dimethyl-S-(p-chlorophenylthiomethyl)
  dithiophosphate
O,O-diethyl-p-chlorophenylmercaptomethyl-
  dithiophosphate (Carbophenothion)
O,O-diethyl-S-p-chlorophenylthiomethyl-
  thiophosphate
O,O-dimethyl-S-(carbethoxy-phenylmethyl)dithio-
  phosphate(Phenthoate)
O,O-diethyl-S-(carbofluorethoxy-phenylmethyl)-
  dithiophosphate
O,O-dimethyl-S-carboisopropoxy-phenylmethyl)-
  dithiophosphate
O,O-diethyl-7-hydroxy-3,4-tetramethylene-
  coumarinyl-thiophosphate (Coumithoate)
2-methoxy-4-H-1,3,2-benzodioxaphosphorin-2-sulphide
O,O-diethyl-O-(5-phenyl-3-isooxazolyl)thiophosphate
2-(diethoxyphosphinylimino)-4-methyl-1,3-dithiolane
Tris-(2-methyl-1-aziridinyl)-phosphine oxide
  (METEPA)
S-(2-chloro-1-phthalimidoethyl)-O,O-diethyldithio-
  phosphate
N-hydroxynaphthalimido-diethylphosphate
Dimethyl-3,5,6-trichloro-2-pyridylphosphate
O,O-dimethyl-O-(3,5,6-trichloro-2-pyridyl)
  thiophosphate
S-2-(ethylsulphonyl)ethyl dimethylthiophosphate
  (Dioxydemeton-S-Methyl)

Diethyl-S-2-(ethylsulphinyl)ethyl dithiophosphate
  (Oxidisulfoton)
Bis-O,O-diethylthiophosphoric acid anhydride
  (Sulfotep)
Dimethyl-1,3-di(carbomethoxy)-1-propen-2-yl-
  phosphate
Dimethyl-(2,2,2-trichloro-1-butyroyloxyethyl)
  phosphate (Butonate)
O,O-dimethyl-O-(2,2-dichloro-1-methoxy-vinyl)
  phosphate
Bis-(dimethylamido)fluorphosphate (Dimefox)
3,4-dichlorobenzyl-triphenylphosphoniumchloride
Dimethyl-N-methoxymethylcarbamoylmethyl-
  dithiophosphate (Formocarbam)
O,O-diethyl-O-(2,2-dichloro-1-chloroethoxyvinyl)
  phosphate
O,O-dimethyl-O-(2,2-dichloro-1-chloroethoxyvinyl)
  phosphate
O-ethyl-S,S-diphenyldithiolphosphate
O-ethyl-S-benzyl-phenyldithiophosphonate
O,O-diethyl-S-benzyl-thiolphosphate
O,O-dimethyl-S-(4-chlorophenylthiomethyl)
  dithiophosphate (Methylcarbophenothion)
O,O-dimethyl-S-(ethylthiomethyl)dithiophosphate
Diisopropylaminofluorophosphate (Mipafox)
O,O-dimethyl-S-(morpholinylcarbamoylmethyl)
  dithiophosphate (Morphothion)
Bismethylamido-phenylphosphate
O,O-dimethyl-S-(benzene sulphonyl)dithiophosphate
O,O-dimethyl-(S and O)-ethylsulphinylethyl-
  thiophosphate
O,O-diethyl-O-4-nitrophenylphosphate
Triethoxy-isopropoxy-bis(thiophosphinyl)
  disulphide
2-methoxy-4H-1,3,2,benzodioxaphosphorin-2-oxide
Octamethylpyrophosphoramide (Schradan)
Bis (dimethoxythiophosphinylsulphido)phenyl-
  methane
N,N,N',N'-tetramethyldiamidofluorophosphate
  (Dimefox)
O-phenyl-O-p-nitrophenyl-methanthiophosphonate
  (Colep)
O-methyl-O-(2-chloro-4-tert.butyl-phenyl)-N-methyl-
  amidothiophosphate (Narlene)
O-ethyl-O-(2,4-dichlorophenyl)-phenylthiophosphonate
O,O-diethyl-O-(4-methylmercapto-3,5-dimethylphenyl)-
  thiophosphate
4,4'-bis-(O,O-dimethylthiophosphoryloxy)-diphenyl
  disulphide
O,O-di-(β-chloroethyl)-O-(3-chloro-4-methyl-
  coumarinyl-7)-phosphate
S-(1-phthalimidoethyl)-O,O-diethyldithiophosphate
O,O-dimethyl-O-(3-chloro-4-diethylsulphamylphenyl)-
  thiophosphate
O-methyl-O-(2-carbisopropoxyphenyl)-amidothio-
  phosphate
5-(O,O-dimethylphosphoryl)-6-chloro-bicyclo(3.2.0)-
  heptadiene (1,5)
O-methyl-O-(2-i-propoxycarbonyl-1-methylvinyl)-
  ethylamidothiophosphate.

NITROPHENOLS AND DERIVATIVES 4,6-dinitro-6-methylphenyl, Na-salt [Dinitrocresol]
dinitrobutylphenol-(2,2',2''-triethanolamine salt
2-cyclohexyl-4,6-dinitrophenyl [Dinex]
2-(1-methylheptyl)-4,6-dinitrophenyl-crotonate
  [Dinocap]
2-sec.-butyl-4,6-dinitrophenyl-3-methyl-butenoate
  [Binapacryl]
2-sec.-butyl-4,6-dinitrophenyl-cyclopropionate
2-sec.-butyl-4,6-dinitrophenylisopropylcarbonate
  [Dinobuton].

MISCELLANEOUS pyrethin I
pyrethin II
3-allyl-2-methyl-4-oxo-2-cyclopentan-1-yl-
  chrysanthemumate (Allethrin)
6-chloriperonyl-chrysanthemumate (Barthrin)
2,4-dimethylbenzyl-chrysanthemumate (Dimethrin)
2,3,4,5-tetrahydrophthalimidomethyl-
  chrysanthemumate
4-chlorobenzyl-4-chlorophenylsulphide
  [Chlorobensid]
6-methyl-2-oxol, 3-dithiolo-[4,5-b]-quinoxaline
  (Quinomethionate)
(I)-3-(2-furfuryl)-2-methyl-4-oxocyclopent-2-enyl(I)-
  (cis+trans)-chrysanthemum-monocarboxylate
  [Furethrin]
2-pivaloyl-indane-1,3-dione [Pindon]
N'-(4-chloro-2-methylphenyl)-N,N-dimethylform-
  amidine [Chlorophenamidin]
4-chlorobenzyl-4-fluorophenyl-sulphide
  [Fluorobenside]
5,6-dichloro-1-phenoxycarbanyl-2-trifluoromethyl-
  benzimidazole [Fenozaflor]
p-chlorophenyl-p-chlorobenzenesulphonate [Ovex]
p-chlorophenyl-benzenesulphonate [Fenson]
p-chlorophenyl-2,4,5-trichlorophenylsulphone
  [Tetradifon]
p-chlorophenyl-2,4,5-trichlorophenylsulphide
  [Tetrasul]
p-chlorobenzyl-p-chlorophenylsulphide
  [Chlorobenside]
2-thio-1,3-dithiolo- 5,6)-quinoxaline
  [Thiochinox]
prop-2-ynyl-(4-t-butylphenoxy)-cyclohexylsulphite
  [Propargil].

FORMAMIDINES 1-dimethyl-2-(2'-methyl-4'-chlorophenyl)-formamidine
  (Chlorphenamidin)
1-methyl-2-(2'-methyl-4'-chlorophenyl -formamidine
1-methyl-2-(2'-methyl-4'-bromophenyl-formamidine
1-methyl-2-(2',4'-dimethylphenyl)-formamidine
1-n-butyl-1-methyl-2-(2'-methyl-4'-chlorophenyl)-
  formamidine
1-methyl-1-(2'-methyl-4'-chloroaniline-methylene)-
  formamidine
2-(2''-methyl-4''-chlorophenyl)-formamadine
1-n-butyl-2-(2'-methyl-4'-chlorophenyl-imino)-
  pyrolidine.

UREA

N-2-methyl-4-chlorophenyl-N',N'-dimethyl-thiourea.

CARBAMATE 1-naphthyl-N-methylcarbamate (Carbaryl)
2-butinyl-4-chlorophenylcarbamate
4-dimethylamino-3,5-xylyl-N-methylcarbamate
4-dimethylamino-3-tolyl-N-methylcarbamate
  (Aminocarb)
4-methylthio-3,5-xylyl-N-methylcarbamate
  (Methiocarb)
3,4,5-trimethylphenyl-N-methylcarbamate
2-chlorophenyl-N-methylcarbamate (CPMC)
5-chloro-6-oxo-2-norborane-carbonitrile-O-(methyl-
  carbamoyl)-oxime
1-(dimethylcarbamoyl)-5-methyl-3-pyrazolyl-N,N-
  dimethylcarbamate (Dimetilan)
2,3-dihydro-2,2-dimethyl-7-benzofuranyl-N-methyl-
  carbamate (Carbofuran)
2-methyl-2-methylthio-propionaldehyde-O-(methyl-
  carbamoyl)-oxime (Aldicarb)
8-chinaldyl-N-methylcarbamate and their salts
methyl 2-isopropyl-4-(methylcarbamoyloxy)carbanilate
m-(1-ethylpropyl)phenyl-N-methylcarbamate
3,5-di-tert.butyl-N-methylcarbamate
m-(1-methylbutyl)phenyl-N-methylcarbamate
2-isopropylphenyl-N-methylcarbamate
2-sec.butylphenyl-N-methylcarbamate
m-tolyl-N-methylcarbamate
2,3-xylyl-N-methylcarbamate
3-isopropylphenyl-N-methylcarbamate
3-tert.butylphenyl-N-methylcarbamate
3-sec.butylphenyl-N-methylcarbamate
3-isopropyl-5-methylphenyl-N-methylcarbamate
  (Promecarb)
3,5-diisopropylphenyl-N-methylcarbamate
2-chloro-5-isopropylphenyl-N-methylcarbamate
2-chloro-4,5-dimethylphenyl-N-methylcarbamate
2-(1,3-dioxolan-2-yl)phenyl-N-methylcarbamate
  (Dioxacarb)
2-(4,5-dimethyl-1,3-dioxolan-2-yl)phenyl-N-methyl-
  carbamate
2-(1,3-dioxolan-2-yl)phenyl-N,N-dimethylcarbamate
2-(1,3-dithiolan-2-yl)-N,N-dimethylcarbamate
2-(1,3-dithiolan-2-yl)phenyl-N,N-dimethylcarbamate
2-isopropoxyphenyl-N-methylcarbamate (Aprocarb)
2-(2-propinyloxy)phenyl-N-methylcarbamate
3-(2-propinyloxy)phenyl-N-methylcarbamate
2-dimethylaminophenyl-N-methylcarbamate
2-diallylaminophenyl-N-methylcarbamate
4-diallylamino-3,5-xylyl-N-methylcarbamate (Allyxicarb)
4-benzothienyl-N-methylcarbamate
2,3-dihydro-2-methyl-7-benzofuranyl-N-methyl-
  carbamate
3-methyl-1-phenylpyrazol-5-yl-N,N-dimethylcarbamate
1-isopropyl-3-methylpyrazol-5-yl-N,N-dimethylcar-
  bamate (Isolan)
2-dimethylamino-5,6-dimethylpyrimidin-4-yl-N,N-
  dimethyl-carbamate
3-methyl-4-dimethylaminomethyleneiminophenyl-N-
  methylcarbamate
3-dimethylamino-methyleneiminophenyl-N-methyl-
  carbamate (Formetanate) and their salts
1-methylthio-ethylimino-N-methylcarbamate (Methomyl)
2-methylcarbamoyloximino-1,3-dithiolane
5-methyl-2-methylcarbamoyloximino-1,3-oxythiolane
2-(1-methoxy-2-propoxy)phenyl-N-methylcarbamate
2-(1-butin-3-yl-oxy)phenyl-N-methylcarbamate
1-dimethylcarbamyl-1-methylthio-O-methylcarbamyl-
  formoxime
1-(2'-cyanoethylthio)-O-methylcarbamyl-acetaldoxime
1-methylthio-O-carbamyl-acetaldoxime
O-(3-sec.butylphenyl)-N-phenylthio-N-methylcarbamate
2,5-dimethyl-1,3-dithioland-2-(O-methylcarbamyl)-
  aldoxime)
O-2-diphenyl-N-methylcarbamate
2-(N-methylcarbamoyl-oximino)-3-chloro-bicyclo
  [2.2.1]heptane
2-(N-methylcarbamyl-oximino)-bicyclo[2.2.1]heptane
3-isopropylphenyl-N-methyl-N-chloroacetyl-carbamate
3-isopropylphenyl-N-methyl-N-methylthiomethyl-
  carbamate
O-(2,2-dimethyl-4-chloro-2,3-dihydro-7-benzofuranyl)-
  N-methylcarbamate
O-(2,2,4-trimethyl-2,3-dihydro-7-benzofuranyl)-N-
  methylcarbamate
O-naphthyl-N-methyl-N-acetyl-carbamate
O-5,6,7,8-tetrahydronaphthyl-N-methyl-carbamate
3-isopropyl-4-methylthio-phenyl-N-methylcarbamate
3,5-dimethyl-4-methoxy-phenyl-N-methylcarbamate
3-methoxymethoxy-phenyl-N-methylcarbamate
3-allyloxyphenyl-N-methylcarbamate
2-propargyloxymethoxy-phenyl-N-methyl-carbamate
2-allyloxyphenyl-N-methyl-carbamate
4-methoxycarbonylamino-3-isopropylphenyl-N-methyl-
  carbamate
3,5-dimethyl-4-methoxycarbonylamino-phenyl-N-methyl-
  carbamate
2-γ-methylthiopropylphenyl-N-methyl-carbamate 3-(α-methoxymethyl-2-propenyl)-phenyl-N-methyl-
  carbamate
2-chloro-4-tert.butyl-phenyl-N-methylcarbamate
4-methyl-propargylamino)-3,5-xylyl-N-methyl-carbamate
4-(methyl-γ-chloroallylamino)-3,5-xylyl-N-methyl-
  carbamate
4-(methyl-β-chloroallylamino)-3,5-xylyl-N-methyl-
  carbamate
1-(β-ethoxycarbonalethyl)-3-methyl-5-pyrazolyl-
  N,N-dimethylcarbamate
3-methyl-4-(dimethylamino-methylmercapto-methyl-
  eneimino)phenyl-N-methylcarbamate
1,3-bis(carbamoylthio)-2-(N,N-dimethylamino)-
  propanehydrochloride
5,5-dimethylhydroresorcinoldimethylcarbamate
2-[ethyl-propargylamino]-phenyl-N-methylcarbamate
2-[methyl-propargylamino]-phenyl-N-methylcarbamate
2-[dipropargylamino]-phenyl-N-methylcarbamate
4-[dipropargylamino]-3-tolyl-N-methylcarbamate
4-[dipropargylamino]-3,5-xylyl-N-methylcarbamate
2-[allyl-isopropylamino]-phenyl-N-methylcarbamate
3-[allyl-isopropylamino]-phenyl-N-methylcarbamate.

CHLORINATED HYDROCARBONS

γ-hexachlorocyclohexane [Gammexane; Lindan; γ HCH]
1,2,4,5,6,7,8,8-octachloro-3α,4,7,7α'-tetrahydro-
  4,7-methylenindane [Chlordan]
1,4,5,6,7,8,8-heptachloro-3α,4,7,7α-tetrahydro-
  4,7-methylenindane [Heptachlor]
1,2,3,4,10,10-hexachloro-1,4,4α,5,8,8α-hexahydro-
  endo-1,4-exo-5,8-dimethanonaphthalene [Aldrin]
1,2,3,4,10,10-hexachloro-6,7-epoxy-1,4,4α,5,6,7,8,8α-
  oxtahydro-exo-1,4-endo-5,8-dimethanonaphthalene
  [Diflorin]
1,2,3,4,10,10-hexachloro-5,7-epoxy-1,4,4α,5,6,7,8,8α-
  octyhydro-endo-endo-5,8-dimethanonaphthalene
  [Endrin].

The compounds of the formula I may be used as pure active substance or together with suitable carriers and/or additives. Suitable carriers and additives can be solid or liquid and correspond to the substances conventionally used in formulation technique such, for example, as solvents dispersants, wetting agents, adhesives, thickeners, binders and/or fertilisers.

For application, the compounds of the formula I may be processed to dusts, emulsion concentrates, granules, dispersions, sprays, to solutions, or suspensions in the conventional formulation which is commonly employed in application terminology. Mention may also be made of "cattle dips" and "spray races," in which aqueous preparations are used.

The agents according to the invention are manufactured in known manner by intimately mixing and/or grinding active substances of the formula I with the suitable carriers, optionally with the addition of dispersants or solvents which are inert towards the active substances. The active substances may be available and can be used in the following forms:

Solid forms
  Dusts, tracking agents, granules, coated granules,
    impregnated granules and homogeneous granules.
Liquid forms:
  (a) active substances which are dispersible in water:
    wettable powders, pastes, emulsions;
  (b) solutions.

To manufacture solid forms (dusts, tracking agents), the active substances are mixed with solid carriers. Suitable carriers are, for example: kaolin, talcum, bolus, loess, chalk, limestone, ground limestone, attaclay, dolomite, diatomaceous earth, precipitated silica, alkaline earth silicates, sodium and potassium aluminium silicates (feldspar and mica), calcium and magnesium sulphates, magnesium oxide, ground synthetic materials, fertilisers, for example ammonium sulphate, ammonium phosphate, ammonium nitrate, urea, ground vegetable products, such as corn meal, bark dust, sawdust, nutshell meal, cellulose powder, residues of plant extractions, activated charcoal etc. These substances can either be used alone or in admixture with one another.

Granules can be very easily manufactured by dissolving an active substance of the formula I in an organic solvent and applying the resulting solution to a granulated material, for example attapulgite, $SiO_2$, granicalcium, bentonite, etc. and then evaporating the solvent.

Polymer granules can also be manufactured by mixing the active substances of the formula I with polymerisable compounds (urea/formaldehyde; dicyandiamide/formaldehyde; melamine/formaldehyde or others), whereupon a mild polymerisation is carried out that does not affect the active substances and in the process of which the granulation is carried out during the gel formation. It is more advantageous to impregnate finished, porous polymer granules (urea/formaldehyde, polyacrylonitrile, polyester or others) which have a specific surface area and a favourable predeterminable adsorption/desorption ratio, with the active substances, for example in the form of their solutions (in a low boiling solvent) and to remove the solvent. Polymer granules of this kind in the form of microgranules having a bulk density of 300 g./litre to 600 g./litre can also be manufactured with the aid of atomisers. The dusting can be carried out from aircraft over extensive areas of cultures of useful plants.

It is also possible to obtain granules by compacting the carrier with the active substance and carriers and subsequently comminuting the product.

To these mixtures can also be added additives which stabilize the active substance and/or non-ionic, anionic and cationic surface active substances, which for example improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, ligin sulfonic acids, their alkali metal and alkaline earth metal salts, polyethylene glycol ethers (Carbowaxes), fatty alcohol polyethylene glycol ethers having 5 to 20 ethylene oxide radicals per molecule and 8 to 18 carbon atoms in the fatty alcohol moiey, condensation products of ethylene oxide/propylene oxide, polyvinyl pyrrolidones, polyvinyl alcohols, condensation products of urea and formaldehyde, and also latex products.

The water-dispersible concentrates of the active substance, i.e. wettable powders, pastes and emulsifiable concentrates, are agents which can be diluted with water to any concentration desired. They consist of active substance, carrier, optionally additives which stabilize the active substance, surface-active substance and anti-foam agents and, optionally, solvents.

Wettable powders and pastes are obtained by mixing and grinding the active substances with dispersing agents and pulverulent carriers in suitable apparatus until homogeneity is attained. Carriers are, for example, those mentioned for the solid forms of application. In some cases it is advantageous to use mixtures of different carriers. As dispersing agents there can be used, for example, condensation products of sulfonated naphthalene and sulfonated naphthalene derivatives with formaldehyde, condensation products of naphthalene or naphthalene sulfonic acids with phenol and formaldehyde, as well as alkali, ammonium and alkaline earth metal salts of lignin sulfonic acid, in addition, alkylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleoyl ethionate, the sodium salt of oleoyl methyl tauride, ditertiary acetylene glycols, dialkyl dilauryl ammonium chloride and fatty acid alkali and alkaline earth metal salts.

Suitable anti-foam agents are silicones.

The active substances are mixed, ground, sieved and strained with the additives mentioned above that, in wettable powder, the solid particle size of from 0.02 to 0.04 and in pastes, of 0.03 is not exceeded. To produce emulsifiable concentrates and pastes, dispersing agents such as those cited above, organic solvents and water are used. Examples of suitable solvents are the following: alcohols, benzene, xylenes, toluene, dimethyl sulfoxide, and mineral oil fractions boiling between 120 and 350° C. The solvents must be not phytotoxic, inert to the active substances.

Furthermore, the agents according to the invention can be applied in the form of solutions. For this purpose the active substance or several active substances of the general formula I are dissolved in suitable organic solvents, mixtures of solvents or in water. Aliphatic and aromatic hydrocarbons, chlorinated derivatives thereof, alkyl naphthalenes, and mineral oils alone or mixed with each other, can be used as organic solvents.

The content of active substance in the above described agents is between 0.1% to 95%, in which connection it should be mentioned that in the case of application from aircraft or some other suitable means of application, it is possible to use concentrations of up to 99.5% or even pure active substance.

The active substances of the formula I can, for example, be formulated as follows:

DUSTS

The following substances are used to manufacture (a) a 5% and (b) a 2% dust:

(a)

|  | Parts |
|---|---|
| Active substance | 5 |
| Talcum | 95 |

(b)

|  | Parts |
|---|---|
| Active substance | 2 |
| Highly disperse silica | 1 |
| Talcum | 97 |

The active substances are mixed with the carriers and ground.

GRANULES

The following substances are used to produce 5% granules:

|  | Parts |
|---|---|
| Active substance | 5 |
| Epichlorohydrin | 0.25 |
| Cetyl polyglycol ether | 0.25 |
| Polyethylene glycol | 3.50 |
| Kaolin (particle size 0.3–0.8 mm.) | 91 |

The active substance is mixed with epichlorohydrin and dissolved with 6 parts of acetone; the polyethylene glycol and cetyl polyglycol ether are then added. The thus obtained solution is sprayed on to kaolin, and the acetone subsequently evaporated in vacuo.

WETTABLE POWDER

The following constituents are used for the preparation of (a) a 40%, (b) and (c) a 25%, and (d) a 10% wettable powder:

(a)

|  | Parts |
|---|---|
| Active substance | 40 |
| Sodium lignin sulphonate | 5 |
| Sodium dibutyl-naphthalene sulphonate | 1 |
| Silica acid | 54 |

(b)

|  | Parts |
|---|---|
| Active substance | 25 |
| Calcium ligin sulphonate | 4.5 |
| Champagne chalk/hydroxyethyl cellulose mixture (1:1) | 1.5 |
| Silica acid | 19.5 |
| Champagne chalk | 19.5 |
| Kaolin | 28.1 |

(c)

|  | Parts |
|---|---|
| Active substance | 25 |
| Isooctylphenoxy-polyoxyethylene-ethanol | 2.5 |
| Champagne chalk/hydroxyethyl cellulose mixture (1:1) | 1.7 |
| Sodium aluminum silicate | 8.3 |
| Kieselgur | 16.5 |
| Kaolin | 46 |

(d)

|  | Parts |
|---|---|
| Active substance | 10 |
| Naphthalenesulphonic acid/formaldehyde condensate | 5 |
| Kaolin | 82 |

The active substances are intimately mixed, in suitable mixers, with the additives, the mixture being then ground in the appropriate mills and rollers. Wettable powders are obtained which can be diluted with water to give suspensions of any desired concentration.

EMULSIFIABLE CONCENTRATES

The following substances are used to produce (a) a 10% and (b) a 25% emulsifiable concentrate:

(a)

|  | Parts |
|---|---|
| Active substance | 10 |
| Epoxidised vegetable oil | 3.4 |
| Combination emulsifier consisting of fatty alcohol polyglycol ether and alkylarylsulphonate calcium salt | 13.4 |
| Dimethylformamide | 40 |
| Xylene | 43.2 |

(b)

|  | Parts |
|---|---|
| Active substance | 25 |
| Epoxidised vegetable oil | 2.5 |
| Alkylarylsulphonate/fatty alcohol-polyglycol ether mixture | 10 |
| Dimethylformamide | 5 |
| Xylene | 57.5 |

From these concentrates it is possible to produce, by dilution with water, emulsion of any desired concentration.

SPRAY

The following constituents are used to prepare a 5% spray:

|  | Parts |
|---|---|
| Active substance | 5 |
| Epichlorohydrin | 1 |
| Benzene (boiling limits 160–190° C.) | 94 |

EXAMPLE 1

(a) 27.6 g. of the sodium salt of hydroxymethacrylic methyl esters are reacted in 200 ccm. of acetonitrile at 40–50° C. with 37.5 g. of O-methyl-N-isopropylamidothiochlorophosphate (b.p.$_{0.2}$, 80° C.) and the customary working up gives 40 g. of ester amide of the formula $$\begin{array}{c} CH_3O \\ \diagdown \\ \phantom{xx}P-OCH=C-COOCH_3 \\ \diagup \phantom{xxx} \\ isoC_3H_7NH \end{array} \begin{array}{c} S \\ \| \\ \phantom{x} \end{array} \begin{array}{c} CH_3 \\ \phantom{x} \\ \phantom{x} \end{array}$$

$n_D^{25}$ 1.4958.

(b) 23.2 g. of hydroxymethacrylic methyl ester (b.p.$_{12}$ 45–50° C.) are treated at 0–10° C. in 150 ccm. of toluene with 38 g. of O-methyl-N-isobutylamidochlorophosphate. Then 20.5 g. of triethylamine are added dropwise at 0–10° C. The customary working up gives 38 g. of esters amide of the formula

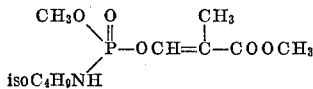

$n_D^{25}$ 1.4601.

(c) 69 g. of the sodium salt of hydroxymethacrylic methyl ester are reacted in 300 ccm. of toluene with 85 g. of thiophosphoryl chloride to give the dichloride of the formula

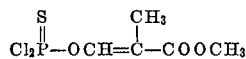

(b.p.$_{0.1}$/80° C.). 24.9 g. of the dichloride of the above formula are reacted in 200 ccm. of toluene at 10–20° C. successively with a mixture of 4.6 g. of ethanol and 10.1 g. of triethylamine and 20 ccm. of toluene, then with 12 g. of isopropylamine. The customary working up gives 23 g. of the ester amide of the formula

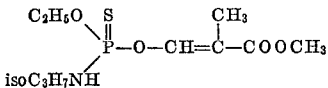

$n_D^{23}$ 1.4918.

(d) 90 g. of O-ethylthiodichlorophosphate are reacted in 300 ccm. of benzene at 10–20° C. with 69 g. of the sodium salt of the sodium salt of hydroxyacrylic methyl ester to give the compound of the formula

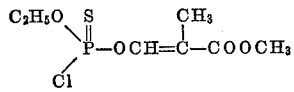

$n_D^{27}$ 1.4945. 26 g. of this compound are charged into 150 ccm. of benzene. Ammonia gas (3.5 g.) is passed in at 10–20° C. and the customary working up gives 20 g. of the compound of the formula

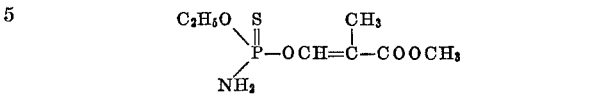

$n_D^{27}$ 1.4996.

(e) 17.8 g. of dimethylamidothiochlorophosphate (b.p.$_{16}$ 85° C.) are reacted in 150 ccm. of toluene at 20–30° C. firstly with a mixture of 10.5 g. of triethylamine and then with a mixture of 4.6 g. of ethanol and 10.5 g. of triethylamine. The customary working up gives the ester of the formula

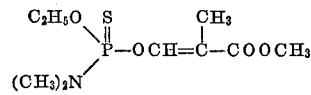

$n_D^{24}$ 1.4918.

The following compounds of the formula I are manufactured in analogous manner:

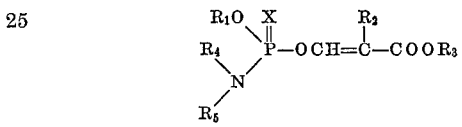

| R$_1$ | R$_2$ | R$_3$ | R$_4$ | R$_5$ | X | Physical data |
|---|---|---|---|---|---|---|
| CH$_3$ | CH$_3$ | CH$_3$ | C$_2$H$_5$ | H | O | $n_D^{25}$ 1.4631 |
| CH$_3$ | CH$_3$ | CH$_3$ | (n)C$_3$H$_7$ | H | O | $n_D^{25}$ 1.4765 |
| CH$_3$ | CH$_3$ | CH$_3$ | (i)C$_3$H$_7$ | H | O | $n_D^{25}$ 1.4589 |
| C$_2$H$_5$ | CH$_3$ | CH$_3$ | CH$_3$ | H | O | $n_D^{25}$ 1.4699 |
| C$_2$H$_5$ | CH$_3$ | CH$_3$ | C$_2$H$_5$ | H | O | $n_D^{25}$ 1.4711 |
| C$_2$H$_5$ | CH$_3$ | CH$_3$ | (n)C$_3$H$_7$ | H | O | $n_D^{25}$ 1.4621 |
| C$_2$H$_5$ | CH$_3$ | CH$_3$ | (i)C$_3$H$_7$ | H | O | $n_D^{25}$ 1.4573 |
| CH$_3$ | CH$_3$ | CH$_3$ | CH$_3$ | H | S | $n_D^{25}$ 1.5049 |
| CH$_3$ | CH$_3$ | CH$_3$ | C$_2$H$_5$ | H | S | $n_D^{25}$ 1.5008 |
| CH$_3$ | CH$_3$ | CH$_3$ | (n)C$_3$H$_7$ | H | S | $n_D^{25}$ 1.4986 |
| CH$_3$ | CH$_3$ | CH$_3$-C$_6$H$_4$- | CH$_3$ | H | S | $n_D^{25}$ 1.5229 |
| CH$_3$ | CH$_3$ | CH$_2$-C$_6$H$_5$- | C$_2$H$_5$ | H | S | $n_D^{25}$ 1.5187 |
| CH$_3$ | CH$_3$ | —C(CH$_3$)$_3$ | C$_2$H$_5$ | H | S | $n_D^{25}$ 1.4921 |
| CH$_3$ | CH$_3$ | —C$_2$H$_4$OCH$_3$ | (n)—C$_3$H$_7$ | H | S | $n_D^{25}$ 1.4929 |
| CH$_3$ | CH$_3$ | C$_2$H$_5$ | (i)—C$_3$H$_7$ | H | S | $n_D^{25}$ 1.4915 |
| CH$_3$ | CH$_3$ | —C$_2$H$_4$—OC$_2$H$_4$—CH$_3$ | (i)—C$_3$H$_7$ | H | S | $n_D^{25}$ 1.4829 |
| C$_2$H$_5$ | CH$_3$ | CH$_3$ | CH$_3$ | H | S | $n_D^{25}$ 1.4939 |
| C$_2$H$_5$ | CH$_3$ | CH$_3$ | C$_2$H$_5$ | H | S | $n_D^{25}$ 1.4961 |
| C$_2$H$_5$ | CH$_3$ | CH$_3$ | (n)—C$_3$H$_7$ | H | S | $n_D^{25}$ 1.4941 |
| C$_2$H$_5$ | CH$_3$ | CH$_3$-CH-C$_6$H$_5$ | CH$_3$ | H | S | $n_D^{24}$ 1.5051 |
| C$_2$H$_5$ | CH$_3$ | Same as above | C$_2$H$_5$ | H | S | $n_D^{24}$ 1.5051 |
| C$_2$H$_5$ | CH$_3$ | do | (i)C$_3$H$_7$ | H | S | $n_D^{24}$ 1.5001 |
| C$_2$H$_5$ | CH$_3$ | —C$_2$H$_4$OCH$_3$ | CH$_3$ | H | S | $n_D^{24}$ 1.4943 |
| C$_2$H$_5$ | CH$_3$ | —C$_2$H$_4$OCH$_3$ | C$_2$H$_5$ | H | S | $n_D^{24}$ .14914 |
| C$_2$H$_5$ | CH$_3$ | —C$_2$H$_4$OCH$_3$ | (n)—C$_3$H$_7$ | H | S | $n_D^{25}$ 1.4901 |
| C$_2$H$_5$ | CH$_3$ | CH$_3$ | C$_2$H$_5$ | H | S | $n_D^{25}$ 1.4901 |
| CH$_3$ | CH$_3$ | (iso)C$_3$H$_7$ | (n)—C$_3$H$_7$ | H | S | $n_D^{25}$ 1.4879 |
| CH$_3$ | CH$_3$ | C$_6$H$_5$ | (iso)—C$_3$H$_7$ |  | O | $n_{D25}$ 1.4938 |
| CH$_3$ | CH$_3$ | —CH$_2$—CH=CH$_2$ | C$_2$H$_5$ | H | S | $n_D^{25}$ 1.4951 |
| CH$_3$ | CH$_3$ | —C$_2$H$_4$SC$_2$H$_5$ | (iso)—C$_3$H$_7$ | H | O | $n_D^{25}$ 1.4729 |
| CH$_3$ | C$_2$H$_5$ | CH$_3$ | (iso)—C$_4$H$_9$ | H | O | $n_D^{25}$ 1.4473 |
| n-C$_3$H$_7$ | CH$_3$ | CH$_3$ | CH$_3$ | H | S | $n_D^{24}$ 1.4966 |
| C$_2$H$_5$ | CH$_3$ | CH$_3$ | CH$_3$ | CH$_3$ | S | $n_D^{24}$ 1.4918 |
| CH$_3$ | CH$_3$ | C(CH$_3$)$_3$ | (iso)—C$_4$H$_9$ | H | O | $n_D^{25}$ 1.4572 |
| CH$_3$ | H | C$_2$H$_5$ | (n)C$_3$H$_7$ | H | S | $n_D^{27}$ 1.5045 |
| CH$_3$ | CH$_3$ | CH$_3$ | —CH$_2$—CH=CH$_2$ | H | S | $n_D^{23}$ 1.5112 |
| CH$_3$ | CH$_3$ | CH$_3$ | —CH$_2$—C≡CH | H | S | $n_D^{23}$ 1.5128 |

EXAMPLE 2

Action against ticks (A) *Rhipicephalus bursa* and adult ticks or 50 tick larvae were counted into a glass tube and immersed for 1 to 2 minutes in 2 ml. of an aqueous emulsion from an emulsion series each containing 100, 10, 1 and 0.1 p.p.m. of test substance. The tube was then sealed with a standardised cotton wool plug and placed on its head, so that the cotton wool was able to absorb the active substance emulsion.

In the case of the adults evaluation took place after 2 weeks, and in that of the larvae after 2 days. Each test was repeated twice.

The compounds according to Example 1 act in the above test against adults and larvae of *Rhipicephalus bursa*.

(B) *Boophilus microplus* (larvae).—Tests are carried out in each case with 20 sensitive and OP-resistant larvae using an analogous dilution series as in the case of test A. (The resistance relates to the tolerability of diazinone.)

The compounds according to Example 1 act in the above tests against adults and larvae of *Rhicephalus bursa* and sensitive and OP-resistant larvae of *Boophilus microplus*.

EXAMPLE 3

Acaricidal action

*Phaseolus vulgaris* (dwarf beans) have an infested piece of leaf from a mass culture of *Tetranychus urticae* placed on them 12 hours before the test for the acaricidal action. The mobile stages which have migrated are sprayed with the emulsified test preparations from a chromatography atomiser so that the spray broth does not run off. The number of living and dead larvae, adults and eggs are evaluated after 2 to 7 days under a stereoscopic microscope and the result expressed in percentages. During the "interim," the treated plants are kept in greenhouse compartments at 25° C.

The compounds according to Example 1 are active in the above test against eggs, larvae and adults of *Tetranychus urticae*.

EXAMPLE 4

(A) Insecticidal ingest poison action.—Tobacco and potato plants are sprayed with a 0.05% aqueous emulsion (obtained from a 10% emulsifiable concentrate).

After the coating has dried, Egyptian cotton leaf worms (*Spodopteria literalis*) are settled on the tobacco plants and Colorado potato beetle larvae (*Leptinotarsa decemlineata*) on the potato plants. The test is carried out at 24° C. and 60% relative humidity.

(B) Systemic insecticidal action.—To determine the systemic action, rooted bean plants (*Vivia fabae*) are put into a 0.01% aqueous active substance solution (obtained from a 10% emulsifiable concentrate). After 24 hours, aphids (*Aphis fabae*) are placed on the parts of the plant above the soil. The aphids are protected from contract and gas action by means of a special device. The test os carried out at 24° C. and 70% relative humidity. In the above tests the compounds according to Example I displayed good insecticidal ingest poison action and systemic insecticidal action.

What is claimed is:

1. A compound of the formula

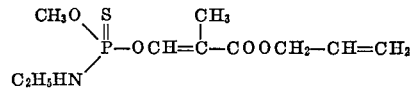

2. A compound of the formula

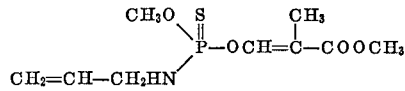

3. A compound of the formula

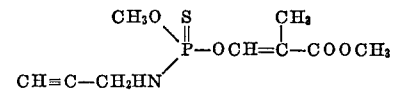

References Cited

UNITED STATES PATENTS

| | | | |
|---|---|---|---|
| 3,709,960 | 1/1973 | Lutz et al. | 260—941 |
| 3,594,454 | 7/1971 | Beriger et al. | 260—941 |
| 3,053,729 | 9/1962 | Sun | 260—941 X |

LORRAINE A. WEINBERGER, Primary Examiner

R. L. RAYMOND, Assistant Examiner

U.S. Cl. X.R.

260—973; 424—212